Sept. 17, 1929. V. S. YARNALL 1,728,320
HANDLE FOR SHOVELS
Filed June 23, 1927

Inventor
Vere S. Yarnall
by Roberts Cushman & Woodberry
Attys.

Patented Sept. 17, 1929

1,728,320

UNITED STATES PATENT OFFICE

VERE S. YARNALL, OF BROCKTON, MASSACHUSETTS, ASSIGNOR TO AMES SHOVEL & TOOL COMPANY, OF BOSTON, MASSACHUSETTS, A CORPORATION OF NEW JERSEY

HANDLE FOR SHOVELS

Application filed June 23, 1927. Serial No. 200,963.

This invention relates to handles for shovels or similar implements, more particularly to improvements in pressed steel shovel handles formed of a single metal sheet, and has for its principal object the provision of a handle of this type which comprises arm members consisting of a folded piece of metal and having integral, grip-receiving cups at their respective outer ends.

A preferred embodiment of the invention is illustrated in the accompanying drawings, in which.

Figure 3:
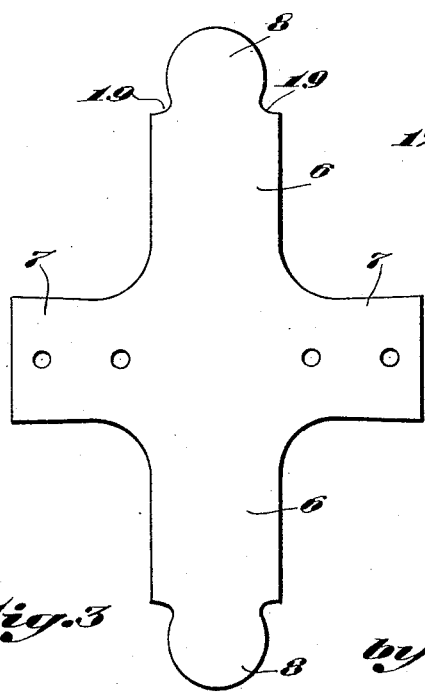
Fig. 3 is a plan view of the metal blank from which the handle is formed.
Figure 4:
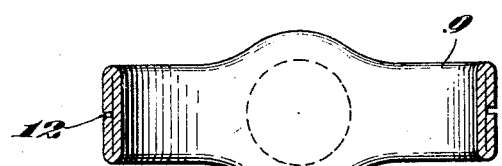
Fig. 4 is a section on the line 4—4 of Fig. 1.
Figure 5:
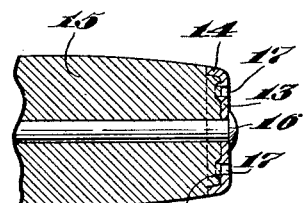
Fig. 5 is a section on the line 5—5 of Fig. 2.

The blank of sheet metal from which the shovel handle may be readily fashioned by suitable apparatus, is preferably stamped out substantially in the shape of Fig. 3 to provide arm portions 6 and socket portions 7. The ends of the arm portions terminate in rounded portions 8 having a diameter slightly smaller than the width of the arm portions.

To form the shank socket and side arms 9 of the shovel handle, the socket portions 7 are bent downwardly and curved around the end of the wooden shank 10 to which they may be secured by suitable rivets 11. The margins of the respective arm portions are folded over flatwise upon the central portion thereof, so that their edges substantially meet at 12 upon the outside of the handle; and the folded arms are curved upwardly in D-shape, as shown in Fig. 2.

The rounded portions 8 of the blank, which are integral with the inner central portions of the folded side arms, are dished outwardly forming cups 13 having peripheral flanges or ferrule portions 14 adapted to receive the respective ends of a wooden grip bar 15. A through rivet 16 fastens the grip within the cups, and grip engaging members may be struck up from the inner surface of the cups to prevent rotation of the grip. Such members are preferably formed by punching diametrically opposed openings 17 through the outer ends of the cups, thereby providing upstanding peripheral ridges 18 on the inner surface of the cups which readily bite into the wood of the grip bar when the rivet is secured.

Figure 1:
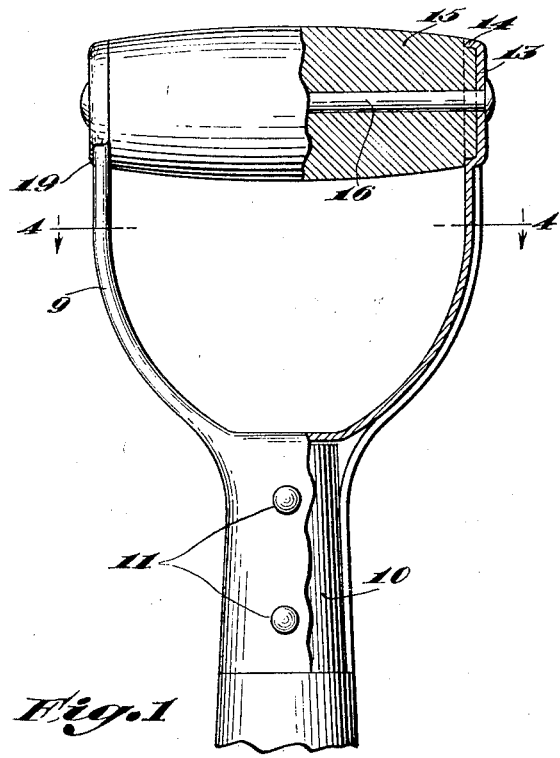
Fig. 1 is a front elevation, partly in section, of the improved shovel handle.
Figure 2:
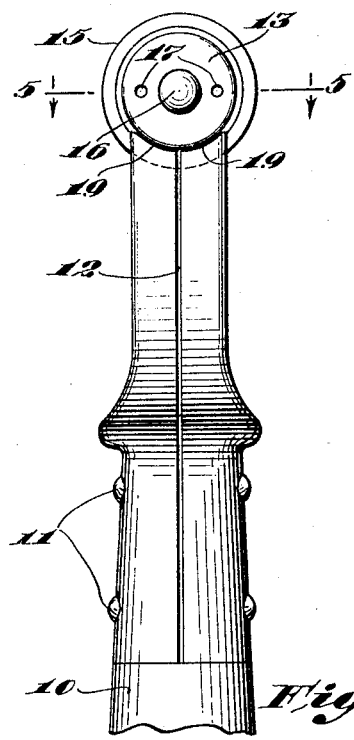
Fig. 2 is a side elevation thereof.

Owing to the curved shoulders 18 which connect the marginal edges of the arm portions 7 of the blank to the arcuate edge of the rounded portion 18, it will be seen from Figs. 1 and 2 that the upper edges 19 of the folded side margins of the arms 9 abut the curved outer surface of the respective cups 13, thus supporting and reinforcing the cup against downward thrusts upon the grip bar and also protecting the hands of the user from contact with a sharp metal edge.

A shovel handle formed in the manner described is simple in construction, economical to manufacture and durable in use. Specific details of construction may, however, be varied without departing from the spirit of this invention as defined in the following claims.

I claim:

1. A sheet metal shovel handle comprising spaced side arms and a shank socket formed of a single metal sheet, each side arm consisting of a metal strip having its side margins folded outwardly upon its central portion, and cups integral with the respective side arms for receiving the ends of a grip bar, the cups being formed on the inner portion of the folded strips and being dished outwardly so that upper edges of said side margins abut the curved outer surface of the cups.

2. A one-piece sheet metal blank adapted to be formed into a shovel handle, comprising a pair of oppositely extending arm portions and a pair of oppositely extending socket portions at right angles to said arm portions, each of the arm portions terminating in an integral rounded end, having a diameter less than the width of the arm portions, the periphery of said rounded ends being connected to the respective marginal edges of the arm portions by curved shoulders.

Signed by me at Boston, Massachusetts, this 22d day of June, 1927.

VERE S. YARNALL.